US008756976B2

(12) United States Patent
Schober et al.

(10) Patent No.: US 8,756,976 B2
(45) Date of Patent: Jun. 24, 2014

(54) SYSTEMS AND METHODS FOR GETTERING AN ATOMIC SENSOR

(75) Inventors: Christina M. Schober, St. Anthony, MN (US); Jennifer S. Strabley, Maple Grove, MN (US); Rodney H. Thorland, Blaine, MN (US); Chad Langness, Robbinsdale, MN (US); Delmer L. Smith, Edina, MN (US); Terry D. Stark, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 331 days.

(21) Appl. No.: 13/231,438

(22) Filed: Sep. 13, 2011

(65) Prior Publication Data

US 2013/0061655 A1 Mar. 14, 2013

(51) Int. Cl.
*G01N 7/00* (2006.01)
*H01S 3/036* (2006.01)
*G04F 5/14* (2006.01)

(52) U.S. Cl.
USPC ................. 73/31.05; 372/59; 372/94; 438/51

(58) Field of Classification Search
CPC ...... B81B 7/0038; G01C 19/661; G04F 5/14; H01S 3/036; H01S 3/0835
USPC ......... 73/23.2, 31.05; 372/33, 59, 94; 438/51; 24/546
See application file for complete search history.

(56) References Cited

U.S. PATENT DOCUMENTS 4,503,543 A * 3/1985 Ljung et al. ..................... 372/94
4,639,231 A * 1/1987 Koper et al. ..................... 445/31
4,670,691 A * 6/1987 Podgorski ..................... 313/549
4,740,985 A * 4/1988 Podgorski ....................... 372/87
5,056,102 A * 10/1991 Galbrecht ....................... 372/87
5,058,124 A 10/1991 Cameron et al.
5,127,016 A * 6/1992 Podgorski ....................... 372/59
5,327,105 A 7/1994 Liberman et al.
5,353,835 A * 10/1994 Mills ............................ 137/590

(Continued)

FOREIGN PATENT DOCUMENTS

| | | |
|---|---|---|
| DE | 3830149 | 3/1990 |
| EP | 2154585 | 2/2010 |
| JP | 61144613 | 2/1986 |
| WO | 2009025893 | 2/2009 |

OTHER PUBLICATIONS

U.S. Patent and Trademark Office, "Office Action", U.S. Appl. No. 13/362,286, Aug. 16, 2013, pp. 1-23.

(Continued)

*Primary Examiner* — Daniel S Larkin

(74) *Attorney, Agent, or Firm* — Fogg & Powers LLC

(57) ABSTRACT

Embodiments of the present invention provide improved systems and methods for providing an atomic sensor device. In one embodiment, the device comprises a sensor body, the sensor body enclosing an atomic sensor, wherein the sensor body contains a gas evacuation site located on the sensor body, the gas evacuation site configured to connect to a gas evacuation device. The device also comprises a getter container coupled to an opening in the sensor body, an opening in the getter container coupled to an opening in the sensor body, such that gas within the sensor body can freely enter the getter container. The device further comprises an evaporable getter enclosed within the getter container, the evaporable getter facing away from the sensor body.

18 Claims, 4 Drawing Sheets

(56) References Cited

U.S. PATENT DOCUMENTS

| | | | | |
|---|---|---|---|---|
| 5,386,432 | A * | 1/1995 | Ficalora et al. | 372/94 |
| 5,528,028 | A | 6/1996 | Chu et al. | |
| 6,194,830 | B1 | 2/2001 | Cho et al. | |
| 6,406,578 | B1 | 6/2002 | Schober et al. | |
| 6,422,824 | B1 | 7/2002 | Lee et al. | |
| 6,670,753 | B1 | 12/2003 | Hatano | |
| 6,837,075 | B1 | 1/2005 | Snowdon et al. | |
| 6,853,135 | B1 | 2/2005 | Fritz et al. | |
| 6,931,711 | B2 * | 8/2005 | Ecklund et al. | 29/469 |
| 7,493,677 | B2 | 2/2009 | Muller et al. | |
| 7,944,317 | B2 | 5/2011 | Strabley et al. | |
| 7,965,147 | B2 | 6/2011 | Strabley et al. | |
| 8,071,019 | B2 | 12/2011 | Touchberry et al. | |
| 2003/0119496 | A1 * | 6/2003 | Gaal et al. | 455/424 |
| 2006/0022761 | A1 | 2/2006 | Abeles et al. | |
| 2006/0051213 | A1 * | 3/2006 | Touchberry et al. | 417/48 |
| 2009/0212204 | A1 * | 8/2009 | McBride | 250/251 |
| 2010/0033255 | A1 | 2/2010 | Strabley et al. | |
| 2010/0111750 | A1 * | 5/2010 | Touchberry et al. | 420/400 |
| 2013/0194046 | A1 | 8/2013 | Schober et al. | |

OTHER PUBLICATIONS

Burt, “Prospects for Ultra-Stable Time Keeping With Sealed Vacuum Operation in Multi-Pole Linear Ion Trap Standards”, “Precise Time and Time Interval (PTTI) Systems and Applications Meeting (39th)”, Nov. 27, 2007, Publisher: National Aeronautics and Space Administration, 2008.

European Patent Office, “European Search Report”, from Foreign Counterpart of U.S. Appl. No. 13/362,286, Apr. 18, 2013, pp. 1-3, Published in: EP.

European Patent Office, “Office Action”, from Foreign Counterpart of U.S. Appl. No. 13/362,286, May 7, 2013, pp. 1-5, Published in: EP.

Shober et al., “Systems and Methods for External Frit Mounted Components”, U.S. Appl. No. 13/362,286, Jan. 31, 2012, pp. 1-22.

Iga et al., “Stacked Planar Optics: an Application of the Planar Microlens”, “Applied Optics”, Oct. 1, 1982, pp. 3456-3460, vol. 21, No. 19.

Oikawa et al., “Optical Tap Array Using Distributed-Index Planar Microlens”, “Electronics Letters”, Apr. 15, 1982, pp. 316-317, vol. 18, No. 8.

U.S. Patent and Trademark Office, “Office Action”, from U.S. Application No. 13/362,286, Dec. 19, 2013, pp. 1-12, Published in: US.

* cited by examiner

SYSTEMS AND METHODS FOR GETTERING AN ATOMIC SENSOR

GOVERNMENT LICENSE RIGHTS

This invention was made with U.S. government support under contract no. W31P4Q-09-C-0348 awarded by the U.S. Army. The U.S. government has certain rights in the invention.

BACKGROUND

Some atomic sensors require ultra high vacuums to work properly. For example, air present within the body of a cold atom clock negatively impacts the functionality of the clock. To prevent air from entering the body of atomic sensors, the air within the body is removed using ion pumps, turbomolecular pumps, and the like. However, over time, small leaks or particle out-gassing allow air to slowly enter the sensor body. To maintain the vacuum within the sensor body, non-evaporable getters are placed within a sensor to remove air that enters the sensor body. However, to have adequate pumping speeds and capacity, non-evaporable getters become relatively large and the size of the non-evaporable getter limits the possible size range of atomic sensors. In some applications, the size requirements of the atomic sensors prevents the use of non-evaporable getters to maintain a vacuum within an atomic sensor.

SUMMARY

The embodiments of the present invention provide systems and methods for a synthetic terrain display and will be understood by reading and studying the following specification.

Embodiments of the present invention provide improved systems and methods for providing an atomic sensor device. In one embodiment, the device comprises a sensor body, the sensor body enclosing an atomic sensor, wherein the sensor body contains a gas evacuation site located on the sensor body, the gas evacuation site configured to connect to a gas evacuation device. The device also comprises a getter container coupled to an opening in the sensor body, an opening in the getter container coupled to an opening in the sensor body, such that gas within the sensor body can freely enter the getter container. The device further comprises evaporable getter material in a getter enclosed within the getter container, the getter facing away from the sensor body.

BRIEF DESCRIPTION OF DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
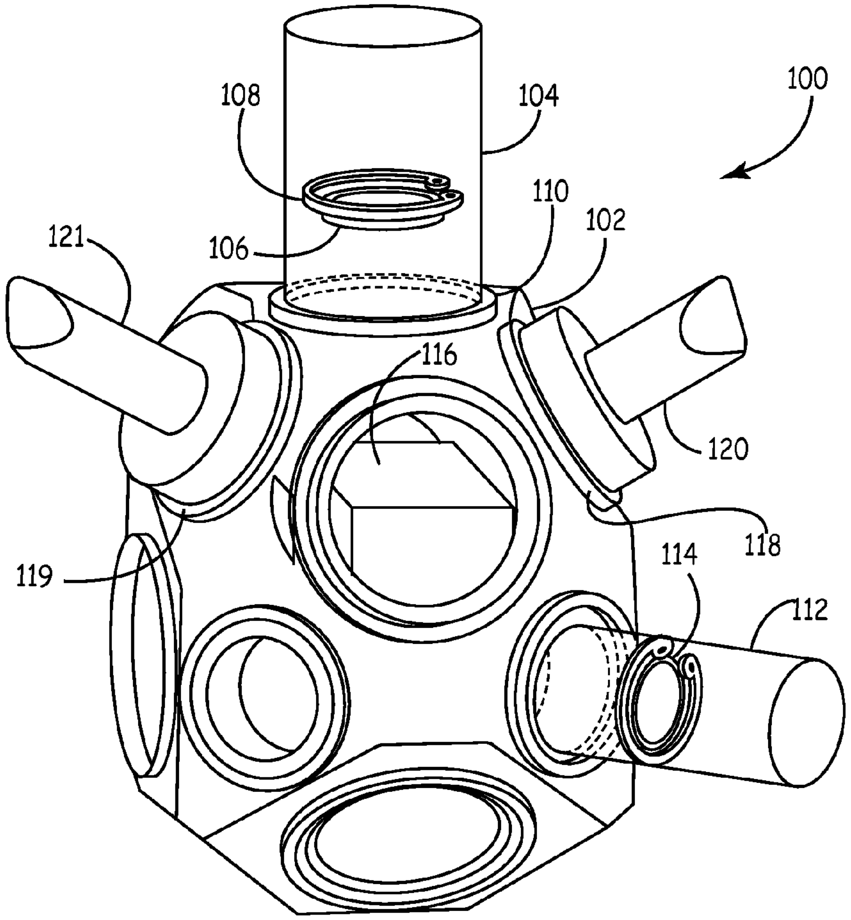
FIG. 1 is a diagram of one embodiment of a system for maintaining a vacuum in an atomic sensor.

In accordance with common practice, the various described features are not drawn to scale but are drawn to emphasize specific features relevant to the exemplary embodiments.

DETAILED DESCRIPTION

In the following detailed description, references are made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

FIG. 1 is a diagram illustrating a system 100 for maintaining a vacuum in an atomic sensor body 102. In certain implementations, the atomic sensor 116 is an atomic clock, a gyroscope, an accelerometer, or the like. Further, the atomic sensor 116 is enclosed within a sensor body 102, where the sensor body is an encasing to protect the atomic sensor. In some implementations, gas present within a sensor body 102 (such as nitrogen, oxygen, argon, or the like) of the atomic sensor affects the ability of the atomic sensor to perform its designed function. For example, cold atom clocks typically operate in an ultra high vacuum for proper operation. To prevent gas contamination from affecting the functionality of the atomic sensor, system 100 includes gas evacuation devices 121 and 120 attached to gas evacuation sites 118 and 119. Gas evacuation sites 118 and 119 provide a location where gas evacuation devices 121 and 120 attach to sensor body 102 to evacuate gas within sensor body 102. Gas is evacuated through gas evacuation site 118 and 119 using detachable fittings, thermal vacuum sealing, gettering, fill/evacuation cycles, temperature bakes, oxygen discharge, or the like. In some embodiments, gas evacuation devices 121 and 120 are fill tubes that are attached to gas evacuation sites 118 and 119 on sensor body 102.

When gas evacuation devices 121 and 120 are fill tubes, in some implementations, the fill tubes are used as an access point to the interior of sensor body 102 to place an alkali metal (such as rubidium, cesium, or any other suitable alkali metal) used for operation of the atomic sensor within sensor body 102. Also, ion pumps or turbo-molecular pumps can also attach to the fill tubes to remove air from within sensor body 102 through the fill tubes. When the air is evacuated from within sensor body 102 through the fill tubes, the fill tubes are sealed to obtain a vacuum tight seal and maintain the vacuum using various techniques, including, for example, pinching and welding or valves. In some implementations, the chamber is evacuated to produce a vacuum and sealed. Then, the alkali metal is released into the chamber under vacuum by crushing the capsule (or by another suitable technique). In an alternative implementation, the chamber is sealed after the alkali metal is released into the chamber. In other words, the alkali metal is introduced into the chamber before evacuation, but the alkali atoms are not released until after evacuation. In a further embodiment, the fill tubes serve as electrodes for forming a plasma for discharge cleaning of sensor body 102 and to enhance pump down (that is, pumping the cavity) and bake out (that is, heating the sensor body 102 to hasten evacuation) of the of sensor body 102. The fill tubes are further described in U.S. patent application Ser. No. 12/484,878 entitled "PHYSICS PACKAGE DESIGN FOR A COLD ATOM PRIMARY FREQUENCY STANDARD" filed on Jun. 15, 2009 and which is referred to herein as the '878 application. The '878 application is incorporated herein by reference.

When gas is removed from within sensor body 102, atomic sensor material is placed in sensor body 102. For example, when atomic sensor 116 is an atomic clock, rubidium or cesium is placed in the evacuated sensor body 102 through gas evacuation site 118 and/or 119. In some implementations, when the atomic sensor material is placed in sensor body 102, gas evacuation sites 118 and 119 are sealed. However, gas, such as cesium or rubidium or other contaminant gasses, may remain in sensor body 102, may enter sensor body 102 after fabrication through a break in bonding materials like sodium silicate or a frit fracture, or may develop within sensor body 102 due to out gassing of interior materials. To create and maintain the vacuum within sensor body 102, a getter 106 further removes remnant air and air that enters sensor body 102.

In this embodiment, evaporable getter material maintains the vacuum within sensor body 102 after the fabrication of atomic sensor 116 finishes. During fabrication, the fabrication process places getter 106 (also referred to as a flashable getter) within sensor body 102, but during fabrication getter 106 is not yet flashed. Getter 106 includes a reservoir of evaporable getter material. In some implementations, when a pump removes the air from within sensor body 102 and the fabrication process seals sensor body 102, the fabrication process places a getter activation device around getter 106 and activates getter 106 by heating the reservoir of getter material held in getter 106 causing the getter material to evaporate. Alternatively, sensor body 102 is sealed after the activation of getter 106. In some implementations, getter material includes a reactive metal, such as barium, aluminum, magnesium, calcium, sodium, strontium, cesium, phosphorus, or the like. The heat applied to the getter material causes the getter material to evaporate and coat an inside surface of sensor body 102. Gas within sensor body 102 after the completion of the fabrication process and gas that enters sensor body 102 after fabrication chemisorbs to the coating of getter material on the inside of sensor body 102. For example, the fabrication process places an evaporable getter that includes a reservoir of barium within sensor body 102. The getter activator heats the barium, which evaporates and coats an inside surface of a body containing the getter. Because of the reactive nature of barium, air within the body chemisorbs to the barium coating. However, the evaporation of the getter material could impair the functionality of atomic sensor 116 if the getter material were to coat a portion of atomic sensor 116 within sensor body 102. Also, the heat used to activate getter 106, if applied to atomic sensor 116, could damage atomic sensor 116.

To prevent damage to or interference with the functionality of atomic sensor 116, the fabrication process places getter 106 within an external getter container 104. Getter container 104 is an enclosure with an opening that attaches to an opening in sensor body 102. Getter container 104 encloses getter 106 such that the evaporation of getter material from getter 106 coats the inside surface of getter container 104 but not an inside surface of sensor body 102. For example, in some implementations, getter 106 is a flattened metal ring with a channel extending around one side of the ring. Further, the fabrication process fills the channel with pressed getter material. The fabrication process places getter 106 within getter container 104 such that the side of the getter that contains the channel faces away from the opening in sensor body 102. Because the ring faces away from the opening, the getter material will evaporate away from sensor body 102 and coat the inside surface of getter container 104. In an alternative implementation, getter 106 is a pan filled with getter material. Similar to the ring, the side of the pan filled with getter material faces away from the opening in sensor body 102. As used herein, facing away from the sensor body 102 means that the getter 106 stores the getter material in such a way that getter material evaporates away from sensor body 102 towards getter container 104.

In a further embodiment, the opening between the interior of sensor body 102 and getter container 104 allows any air remaining in sensor body 102 to freely circulate between getter container 104 and sensor body 102. For example, the fabrication process joins getter container 104 to sensor body 102 such that an opening in the getter container joins to an opening in the sensor body 102. Further, any air remaining within the combination of getter container 104 and sensor body 102 freely circulates around the enclosed volume such that it comes into contact with and chemisorbs to the coating of getter material on the interior surface of getter container 104. In some implementations, getter container 104 is shaped like a cup, where the mouth of the cup attaches to an opening in the sensor body 102 and the getter 106 faces away from sensor body 102 so that the getter material coats the bottom of the cup like shape of getter container 104.

In some implementations, getter container 104 is fabricated from an insulating material. The application of heat activates getter material stored on getter 106. If getter container 104 conducts the heat developed during the activation of the getter material on getter 106 to sensor body 102, the heat could damage the atomic sensor. Thus, the material used to fabricate getter container 104 insulates sensor body 102 from the heat developed in the activation of getter material on getter 106. For example, getter container 104 is fabricated from glass, ceramics, or the like, in such embodiments. In an alternative embodiment, when getter 106 is heated using inductive heating and getter container 104 is thermally isolated from getter 106, getter container 104 is fabricated from a material that does not respond to inductive heating. For example, getter container 104 is fabricated from a non-ferromagnetic material, such as aluminum.

In certain embodiments, a seal 110 secures getter container 104 to sensor body 102 while providing an airtight seal where getter container 104 is joined to sensor body 102. To secure getter container 104 to sensor body 102 with seal 110, a sealing material is applied at the location where getter container 104 contacts sensor body 102. For example, frit is applied at the location where getter container 104 and sensor body 102 connect in some embodiments. Subsequently, the sensor body 102 and getter container 104 are heated. The heat causes the applied material to flow around the location where getter container 104 contacts sensor body 102. When the applied material has flowed around the location where getter container 104 contacts sensor body 102, the applied material is cooled. The cooling hardens the material and forms an airtight seal around the joint of sensor body 102 and getter container 104. For example, the applied frit is melted and cooled, forming a hardened, airtight connection between sensor body 102 and getter container 104. In an alternative implementation, getter container 104 is manufactured from the same material as sensor body 102 such that getter container 104 and sensor body 102 are a single piece of material.

In some implementations, the sensor body 102 connects to multiple getter containers. For example, sensor body 102 connects to a first getter container 104 and a second getter container 112 in FIG. 1. Each getter container 104 and 112 includes a getter, for instance, getter container 104 encloses a first getter 106 and getter container 112 encloses a second getter 114. In some implementations, the multiple getter containers increase the surface area coated by the getter material. The increased surface area improves the ability of the multiple getters to maintain a vacuum within the sensor body 102.

In some implementations, a getter securer secures the getter 106 at a location inside getter container 104. The phrase "getter securer," as used herein, refers to a structure or device that secures the getter 106 at a location within getter container 104. For example, getter 106 is attached to a snap ring 108 in the embodiment shown in FIG. 1. Snap ring 108 is pinched and inserted into getter container 104. When snap ring 108 is located at the desired location within getter container 104, snap ring 108 is released and snap ring 108 expands to secure getter 106 in place. Alternatively, the getter securer can be manufactured as part of getter container 104, or part of sensor body 102.

Figure 2:
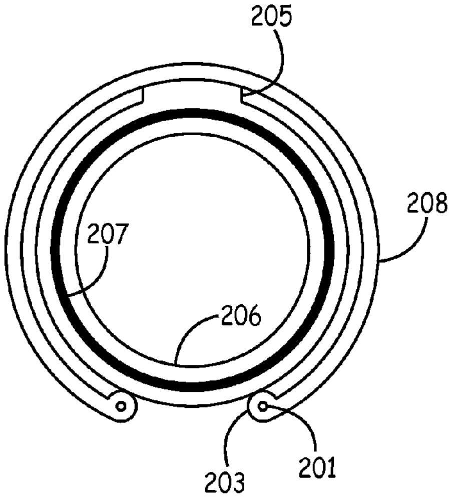
FIG. 2 is an illustrates one embodiment of a getter securer according to one embodiment.

FIG. 2 illustrates a snap ring 208 and a getter 206 according to one embodiment. In certain embodiments, snap ring 208 is a metal spring like ring that can be deformed to fit inside a getter container. To aid in deforming snap ring 208, snap ring 208 includes, in this embodiment, holes 201 in tabs 203. A tool can be inserted through holes 201 in tabs 203 to either compress or extend snap ring 208. Pressing tabs 203 together decreases the diameter of snap ring 208, allowing it to fit within a getter container. When the tool places snap ring 208 within a getter container at a desired location, the tool releases snap ring 208, which springs against the sides of the getter container. The pressure from snap ring 208 against the sides of the getter container secures snap ring 208 in place.

In at least one embodiment, a connector 205 connects snap ring 208 to getter 206. The connector 205 allows the snap ring 208 to also secure getter 206 in place within the getter container. Getter 206 is a ring with a getter material channel 207. The getter material channel 207 holds getter material during assembly. For example, in some implementations, getter material channel 207 contains barium that has been pressed into getter material channel 207. The getter material in getter material channel 207 remains located within the getter material channel 207 until the getter material in getter 206 is activated.

Figure 3:
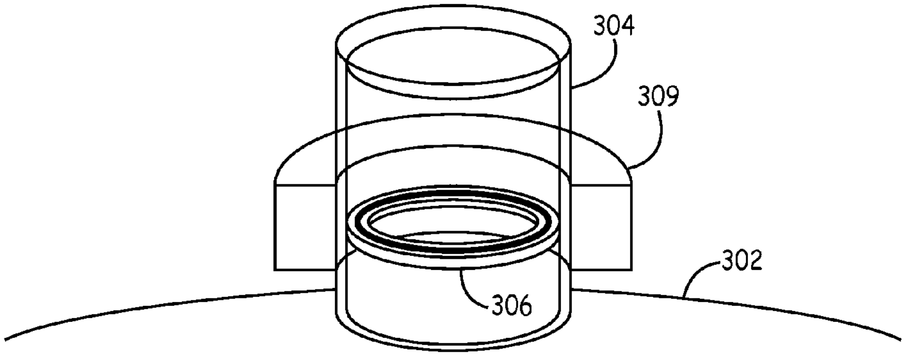
FIG. 3 illustrates one embodiment of a getter activation device.

FIG. 3 illustrates a block diagram illustrating a system for activating a getter 306 within a getter container 304 attached to a sensor body 302. In one implementation, to activate the getter material on getter 306, a getter activation device 309 is temporarily attached to an outside surface of the getter container 304 proximate to the location of the getter 306 within the getter container 304. The getter activation device 309, in this example, is an RF induction coil or other element that heats the getter 306 within getter container 304. By placing the getter activation device 309 on the outside surface of getter container 304, where getter container 304 is outside the sensor body 302, getter activation device 309 activates the getter material on getter 306 without damaging the interior of sensor body 302. Further, the getter container 304 is made from an insulative material like glass, in some embodiments, that does not heat up in response to an RF induction coil. In an alternative embodiment, other devices that heat getter 306 are used for activation, such as a laser heater. Once the getter material on getter 306 is activated, the getter material can function to preserve the vacuum within the atomic sensor.

Figure 4:
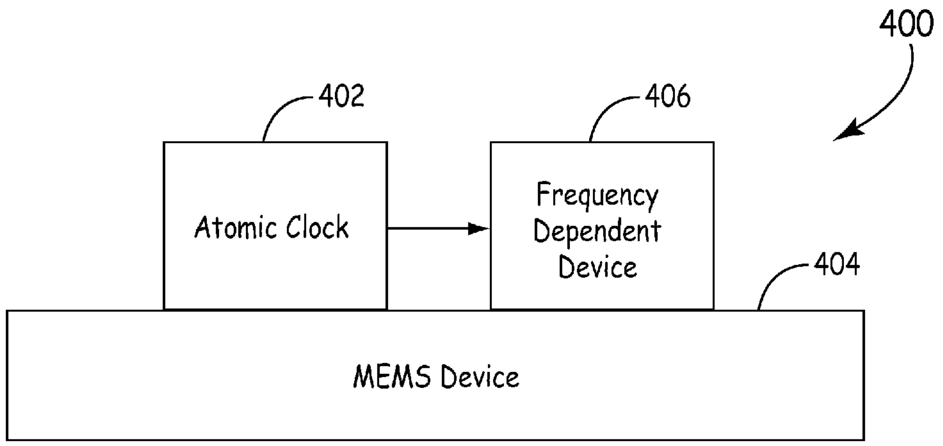
FIG. 4 is a block diagram showing one embodiment of the implementation of an atomic clock.

In certain embodiments, the atomic sensor is an atomic clock. The implementation of getters enables the manufacture of small atomic clocks that can be used to provide a reference frequency signal to frequency dependent applications like Global Positioning system satellites, unmanned aerial vehicles, navigation systems, or the like. FIG. 4 illustrates the implementation of an atomic clock 402 in a system 400. In certain embodiments, atomic clock 402, constructed implementing evaporable getters as described above, is small enough to be used in micro-electromechanical systems (MEMS). For example, atomic clock 402 is mounted as part of a MEMS device 404. Atomic clock 402 produces a reference frequency and provides the reference frequency to a frequency dependent device 406. The reference frequency provided by atomic clock 402 increases the operational accuracy of frequency dependent device 406. For example, when frequency dependent device 406 is a component of a Global Positioning System satellite, the atomic clock 402 allows the satellite to provide more accurate reference times for the accurate calculation of positions.

Figure 5:
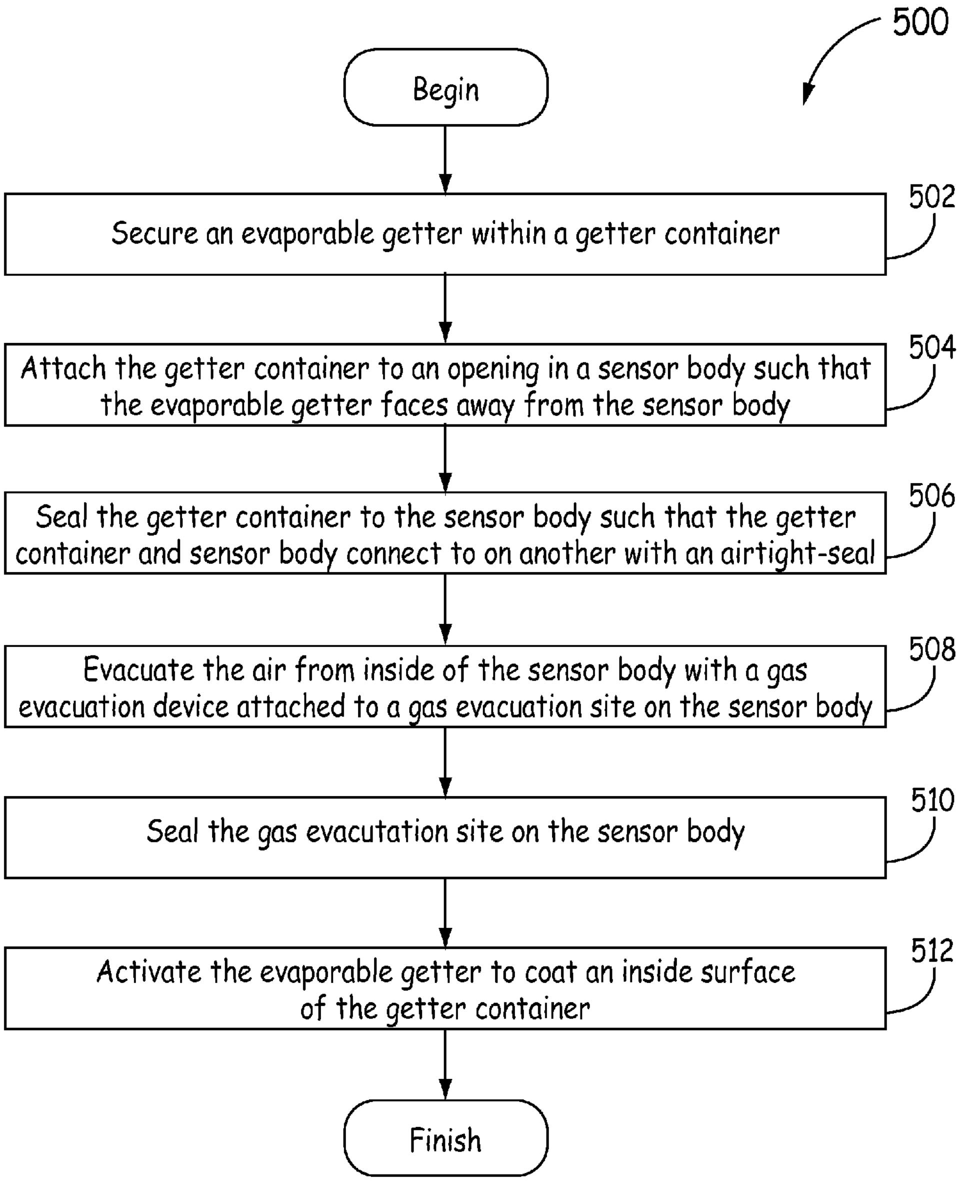
FIG. 5 is a flow chart diagram describing the evacuation of air from an atomic sensor according to one embodiment.

FIG. 5 is a flow diagram of a method 500 for evacuating air from an atomic sensor. Method 500 can be performed to fabricate system 100 described above in FIG. 1. At block 502, a getter is secured within a getter container. At block 504, the getter container is attached to an opening in a sensor body such that the getter faces away from the sensor body. Alternatively, the getter is secured within the getter container after the getter container is attached to the sensor body. In some implementations, where the atomic sensor is an atomic clock, sensor components, like rubidium, are inserted into the sensor body. At block 506, the getter container is sealed to the sensor body such that the getter container and sensor body connect to one another with an airtight seal. At block 508, the air is evacuated from inside of the sensor body with a gas evacuation device attached to a gas evacuation site on the sensor body. At block 510, the gas evacuation site on the sensor body is sealed. At block 512, the evaporable getter is activated to coat an inside surface of the getter container. For example, a heater, applied to the external surface of the getter container, heats the getter. The reactive material in the getter evaporates and coats an inside surface of the getter container. The coating of getter material on the inside surface of the getter container chemisorbs air present within the sensor body.

Although specific embodiments have been illustrated and described herein, it will be appreciated by those of ordinary skill in the art that any arrangement, which is calculated to achieve the same purpose, may be substituted for the specific embodiments shown. Further, the terms gas and air, as referred to in the body of the specification, are used interchangeably in terms to the evacuation of gas or air using a getter. Therefore, it is manifestly intended that this invention be limited only by the claims and the equivalents thereof.

The invention claimed is:

1. An atomic sensor device, the device comprising:

a sensor body, the sensor body enclosing an atomic sensor, wherein the sensor body contains a gas evacuation site located on the sensor body, the gas evacuation site configured to connect to a gas evacuation device;

a getter container coupled to an opening other than the gas evacuation site in the sensor body, an opening in the getter container coupled to an opening in the sensor body, such that gas within the sensor body can freely enter the getter container; and a getter enclosed within the getter container, the getter facing away from the sensor body.

2. The device of claim 1, further comprising a getter securer configured to secure the getter at a location within the getter container.

3. The device of claim 2, wherein the getter securer is a snap ring hoop, the snap ring hoop welded via a connecter to the getter.

4. The device of claim 1, wherein the getter container is made from an insulating material.

5. The device of claim 1, further comprising an airtight seal joining the getter container to the sensor body.

6. The device of claim 5, wherein the airtight seal comprises heated frit.

7. The device of claim 1, wherein getter material in the getter is activated by inductive heating such that the getter material evaporates away from the getter.

8. The device of claim 1, wherein the getter comprises a ring having a channel therein, the channel containing a getter material, the channel facing away from the interior of the sensor body.

9. The device of claim 8, wherein the getter material is barium.

10. The device of claim 1, further comprising at least one additional getter container; wherein the sensor body is attached to the at least one additional getter container, the at least one additional getter container containing an additional getter.

11. A system for providing a reference frequency, the system comprising:

an atomic sensor device, the atomic sensor device configured to produce a reference frequency signal, wherein the atomic sensor device comprises:

a sensor body, the sensor body enclosing an atomic sensor;

a gas evacuation site located on the sensor body, the gas evacuation site configured to connect to a gas evacuation device;

a getter container coupled to an opening other than the gas evacuation site in the sensor body, the getter container comprising:

an opening in the getter container coupled to the opening in the sensor body, such that gas within the sensor body can freely enter the getter container;

a getter enclosed within the getter container, the getter facing away from the sensor body; and a getter securer that secures the getter within the getter container such that the getter faces away from the container opening; and a seal that seals the container opening to the opening in the sensor body;

wherein the system further comprises a frequency dependent device coupled to the atomic sensor device, the frequency dependent device receiving the reference frequency signal.

12. The system of claim 11, wherein the getter securer is a snap ring hoop, the snap ring hoop welded via a connector to the evaporable getter.

13. The system of claim 11, wherein the seal is made using frit.

14. The system of claim 11, further comprising a getter activator configured to activate getter material in the getter.

15. The system of claim 14, wherein the getter activator comprises an induction coil located on the external surface of the getter container proximate to the getter.

16. The system of claim 11, wherein the getter comprises a metal ring having a channel therein, the channel containing a getter material.

17. The system of claim 11, wherein gas is evacuated from inside the sensor body through at least one fill tube.

18. The system of claim 11, wherein the frequency dependent device is at least one of:

a Global Positioning System satellite;

an unmanned aerial vehicle; or a navigation system.

* * * * *